United States Patent Office 3,408,443
Patented Oct. 29, 1968

3,408,443
CONTROL OF INTERNAL PARASITES OF SWINE AND SHEEP WITH DIMETHYL 2,2-DICHLORO-VINYL PHOSPHATE
Sumner H. McAllister, Greenwich, Conn., assignor to Shell Oil Company, New York, N.Y., a corporation of Delaware
No Drawing. Filed Nov. 17, 1964, Ser. No. 411,719
2 Claims. (Cl. 424—219)

ABSTRACT OF THE DISCLOSURE

The control of internal parasites in swine and sheep with dimethyl-2,2-dichlorovinyl phosphate.

---

This invention relates to a method for controlling internal parasites (endoparasites) of swine and sheep.

Control of internal parasites of domestic animals is one of the most important problems now encountered in animal husbandry. In the case of swine, the problem is intensified by the usual practice of raising the swine in pens or other restricted areas. However, even with the best of housekeeping, it is difficult to avoid infestation of new animals and reinfestation of animals that have been cleared of parasites. It is necessary, therefore, to use an anthelmintic—initially to clear the animals of parasites, and then to keep them clear of parasites. A practically successful anthelmintic must satisfy very severe, and in many ways contradictory, requirements. Thus, it must be effective against the internal parasites in situ in the host animal, it must not injure the animal when used at the parasiticidally effective dosage, it must not build up in concentration in the host animal—it must be metabolized and/or excreted from the animal after it has done its job—and it must be capable of administration and safe-handling by untrained or careless personnel, and by means which are readily adaptable to treatment of few, or many, animals.

Dimethyl 2,2-dichlorovinyl phosphate, marketed commercially as VAPONA® Insecticide, and commonly known as DDVP, has been found to be a satisfactory anthelmintic, meeting all of the above requirements except that in the past it has been considered necessary to specially formulate it in a thermoplastic resin or wax to control the release of the anthelmintic in the animal so as to kill the parasites without injury to the animal. Formulation in the resin also was considered necessary to protect the anthelmintic from degradation by moisture and/or oxygen during storage.

This invention provides a method for the control of internal parasites of swine and sheep by the administration of DDVP in water. A further embodiment of the invention is to provide suitable compositions of DDVP which can be administered in the animals' drinking water.

It has been discovered that DDVP can be effectively administered to swine and sheep by introducing it into their drinking water. It has been found that DDVP so administered is an effective anthelmintic. DDVP has been found sufficiently stable in water, even at elevated temperatures found in water troughs in open sunlight during summer months, to maintain an effective dosage for at least 48 hours, which appears to be about the optimum minimum time of treatment. Further, and most important to the use of DDVP for this purpose by untrained or careless personnel, it has been found that DDVP in water has a built-in safeguard. Swine and sheep will refuse to drink water containing DDVP in such quantities that might harm them. The concentrations of DDVP in drinking water which hogs will readily accept are those below toxic levels and yet within an anthelmintically effective range. Thus, in repeated tests, it has been found that swine and sheep readily accept solutions of DDVP in water in which the DDVP concentration is effective in controlling internal parasites, but not sufficiently great to harm the host animal, yet swine and sheep invariably refused to drink solutions in which the amount of DDVP approached that which might cause harm. The difference in concentration of DDVP in drinking water refused by sheep and swine and the concentration which will effectively control internal parasites is appreciable, thus adding to the safety of DDVP administered in this manner.

Thus, administration of DDVP in the drinking water provides a simple, effective and safe way of introducing the anthelmintic into the animal—and avoids accidental overdose by untrained and careless personnel.

It has further been found that DDVP is stable in water at the normal pH range of drinking water. Acidity below the pH of about 3.5 will impair DDVP stability when DDVP is kept at such acidity for several days.

These features of administering DDVP in drinking water of swine are demonstrated in the following examples:

EXAMPLE I.—Ascarid control by administering DDVP in drinking water of infested swine Eight pigs maintained in outdoor pens were fed regular hog ration and given DDVP in their drinking water for two days. Counts of ascarid eggs in the feces of the animals prior to the treatment were made, and at six days after beginning of the treatment, after which the animals were sacrificed and necropsy counts of the ascarid worms in the stomach and gut were made. The pigs did not appear to be adversely affected by the treatments—weight gain and water consumption were normal.

The results are summarized in Table I.

TABLE I.—ASCARID COUNTS OF DDVP-TREATED HOGS

| Animal Number | DDVP in water, percent | Ascarid eggs/gm. feces | | Ascarid worms at necropsy |
|---|---|---|---|---|
| | | Start | End | |
| 402 | 0.025 | 1,977 | 1,844 | 0 |
| 383 | 0.025 | 1,596 | 473 | 0 |
| 385 | 0.025 | 406 | 0 | 0 |
| 396 | 0.025 | 321 | 0 | 0 |
| 381 | 0.05 | 1,741 | 169 | 0 |
| 382 | 0.05 | 1,014 | 0 | 0 |
| 400 | 0.05 | 693 | 0 | 0 |
| 394 | 0.05 | 338 | 0 | 0 |

Conclusions:

(1) The DDVP was effective in controlling pig ascarids.
(2) The animals were not adversely affected by drinking water treated with 0.05% DDVP.

EXAMPLE II

To establish effective dosages of DDVP in the swine's drinking water, a second experiment was conducted, the procedure being essentially that described in Example I, but at low dosages of DDVP in the drinking water. The results are summarized in Table II.

TABLE II.—ASCARID COUNTS OF DDVP-TREATED HOGS

| Animal Number | DDVP in water, percent | Ascarid eggs/gm. feces | | Ascarids eliminated during trial | Ascarid worms at necropsy |
|---|---|---|---|---|---|
| | | Start | End | | |
| 535 | 0 | 3,904 | 3,008 | 2 | 15 |
| 544 | 0 | 1,453 | 1,284 | 1 | 8 |
| 546 | 0 | 507 | 0 | 0 | 2 |
| 541 | 0.006 | 3,160 | 5,501 | 7 | 23 |
| 542 | 0.006 | 1,436 | 744 | 0 | 8 |
| 537 | 0.006 | 608 | 186 | 0 | 5 |
| 545 | 0.0125 | 5,408 | 270 | 16 | 2 |
| 538 | 0.0125 | 1,639 | 0 | 13 | 1 |
| 543 | 0.0125 | 338 | 0 | 4 | 2 |
| 536 | 0.025 | 1,994 | 0 | 8 | 2 |
| 540 | 0.025 | 997 | 0 | 9 | 0 |
| 534 | 0.025 | 777 | 32 | 6 | 1 |

Conclusions:
(1) Under conditions used—48-hour treatment—a concentration of 0.025% DDVP in the drinking water effectively reduced the swine ascarid population, but the concentration of 0.006% DDVP did not.

(2) From these, and other observations, the optimum effective concentration of DDVP for a 48-hour treatment is about 0.02% by weight in the swine's drinking water.

EXAMPLE III. The "safety factor"

It was initially found that hogs will not drink water containing 1% DDVP. When animals were offered the free choice of various levels of DDVP in their water, they selected the lower concentration of treated water. When the choice of treated versus untreated water was offered, the untreated was preferred. Table III summarizes the data of daily water consumption when the choice of untreated water and treatments of two different concentrations were available and tests where the choice was between a lower (.05%) and a higher (0.5%) concentration.

TABLE III.—AVERAGE DAILY WATER-DDVP CONSUMPTION IN MILLILITERS FOR FOUR PIGS

| Day | DDVP-Water Concentration, Percent | | | |
| --- | --- | --- | --- | --- |
| | 0 | 0.05 | 0.5 | 1.0 |
| 1 | 2,640 | | 120 | 250 |
| 2 | 2,800 | | 220 | 200 |
| 3 | 1,760 | 1,000 | 320 | |
| 4 | 2,370 | 1,360 | 300 | |
| 5 | 2,150 | 360 | 136 | |
| 6 | | 1,490 | 320 | |
| 7 | | 1,510 | 310 | |

While the swine drank substantially less of the 0.05% DDVP solution (compared to water alone) the dosage they drank was anthelmintically effective and had no adverse effect upon the swine.

In further trials evaluating physical responses of hogs fed DDVP in drinking water, it was confirmed that DDVP fed at 0.025% or 0.05% for a 5-day period had no adverse physical effects to young growing swine. Many factors were evaluated, including, weight gain, food consumption, water consumption, blood cholinesterase levels, hemoglobin, packed cell volume, erythrocyte counts, blood urea, and total differential leucocyte counts.

Conclusions:
(1) Even at concentrations of DDVP as low as 0.05% the swine curtailed their intake of water.
(2) Since no injury occured to swine offered water containing DDVP at concentrations as high as 1%, and anthelmintically effective dosages are of the order of 0.02%, DDVP exhibits a substantial "safety factor"—that is, the difference between anthelmintically effective dosages, which the swine will accept, and the injurious dosages is at least approximately 50-fold.

EXAMPLE IV

To demonstrate the effectiveness of DDVP fed to sheep in their drinking water, the following test was conducted. Four sheep parasitized with internal parasites were selected for test. Two animals were given drinking water containing 0.025% by weight DDVP for six days and two were given untreated water. The daily water intake and total weight gain for the experimental period indicated that the animals were not adversely effected by the treatment. Anthelmintic effectiveness was evaluated by comparison of pre-treatment and post-treatment fecal egg counts, and by total worm counts in the digestive tract made at necropsy. These data summarized in Table IV shows that 0.025%, DDVP is highly effective in reducing both the egg count and total worm count of sheep infected with internal parasites.

TABLE IV.—DDVP-DRINKING WATER SHEEP ANTHELMINTIC TRIAL

| Sheep No. | DDVP in water, percent/w. | Fecal Egg Count/gram feces | | Total Worm Count | | | | | |
| --- | --- | --- | --- | --- | --- | --- | --- | --- | --- |
| | | Pre-treatment | Post-treatment | Haemonchus | Ostertagia | Trichostrongylus | Nematodirus | Cooperia | Total |
| 745 | 0 | 2,011 | 693 | 2,580 | 20 | 1,340 | 1,060 | 40 | 5,040 |
| 756 | 0 | 1,132 | 507 | 3,840 | 160 | 3,740 | 1,140 | 40 | 8,920 |
| 701 | 0.025 | 3,887 | 4 | 85 | 40 | 450 | 65 | 0 | 640 |
| 666 | 0.025 | 1,859 | 2 | 0 | 47 | 971 | 220 | 0 | 1,238 |

The stability of DDVP in water is demonstrated by the following experiments.

The stability of DDVP at 0.05% was determined at a wide range of temperatures, at varying pH's and for different lengths of storage time. DDVP content was determined by chemical analysis after storage under the conditions given in Table V. These data have been summarized in Table V.

TABLE V.—STABILITY OF 0.05% WEIGHT DDVP IN WATER
[80 p.p.m. Hardness]

| 10 Days of Storage | Temperature, °C. | pH | Percent DDVP Remaining |
| --- | --- | --- | --- |
| 1 | 5 | 4.5 | 100 |
| 1 | 21 | 4.3 | 100 |
| 1 | 38 | 3.6 | 87 |
| 1 | 55 | 3.2 | 57 |
| 3 | 5 | 4.5 | 101 |
| 3 | 21 | 4.1 | 100 |
| 3 | 38 | 3.3 | 79 |
| 3 | 55 | 2.9 | 14 |
| 7 | 5 | 4.4 | 98 |
| 7 | 21 | 3.9 | 87 |
| 7 | 38 | 3.1 | 45 |
| 7 | 55 | 2.8 | 0 |
| 14 | 5 | 4.0 | 98 |
| 14 | 21 | 3.15 | 79 |
| 14 | 38 | 2.9 | 18 |

These studies indicate that DDVP at this level is relatively stable at the normal temperatures, water pH's, and time of required treatment contemplated for its use as an anthelmintic in swine drinking water.

It is thus evident that this invention provides an effective, practically useful method for treating swine and sheep to control internal parasites, this method comprising providing in the drinking water of said animals an effective concentration of dimethyl 2,2-dichlorovinyl phosphate.

Not only is this method effective and practically useful, but it also is substantially less expensive than the earlier known method wherein the anthelmintic was combined with a thermoplastic resin, for the method of this avoids the necessity and cost of combining the anthelmintic with the resin and the mixing of the formulation with feed, or otherwise administering it to the animal.

The anthelmintic effectiveness of DDVP in the drinking water appears to depend upon a dosage-treatment time relationship, with a lower dosage being effective as a longer treatment period is used. Thus, for a treatment time of about 48 hours, the minimum effective dosage appears to be about 0.010 to about 0.020 percent by weight of DDVP in the water, while lower dosages—of the order of about 0.005 percent by weight—can be effective at longer treatment times—for example, about 72 to 96 hours. Regardless of the treatment time, the maximum useful dosages appears to be about 0.05 percent by weight for swine. At such higher dosages, treatment times of as little as 18–24 hours can be sufficient. In any case, however, since DDVP appears to be readily metabolized and/or eliminated by swine and sheep, with no accumulation, DDVP can be furnished for indefinite periods of time, if desired.

The optimum dosage range should take into consideration the weight, age, breed and degree of infestation of the animals to be treated. Time of year may also affect the water intake of the animals and the optimum concentration of the anthelmintic in the water should be governed accordingly. The anthelmintic properties of DDVP in drinking water of swine is unaffected by season.

The necessary concentration of DDVP can be furnished by merely mixing the appropriate amount of DDVP in the drinking water. The DDVP may be supplied in the form of the technical product, or can be supplied in the form of a suspendable wettable powder, containing wetting and suspending agents known to the art. Liquid formulations of emulsifiable concentrates, containing DDVP in a suitable solvent plus emulsifying agents may be employed. Other liquid preparations, containing the DDVP anthelmintic in buffered aqueous solutions may be used. The quantity of DDVP in a suitable formulation may vary from as much as 95% to as little as 1% by weight of the total formulation. Account should be taken of the fact that DDVP does have a measurable rate of decomposition in water, so sufficient should be introduced at the outset to provide the desired dosage at the end of the treatment, or, alternatively, the DDVP can be introduced from time to time as necessary to provide the required concentration.

When added to the drinking water as an anthelmintic, DDVP can be used along with other drugs, such as antibiotics, trace elements used as micronutrients, hormones, vitamins, and other additives normally administered in animal drinking water.

I claim as my invention:
1. A method for controlling helminths in swine and sheep which comprises providing as the drinking water for said animals a mixture consisting essentially of potable water and dimethyl 2,2-dichlorovinyl phosphate, the latter in concentration toxic to helminths.
2. A method according to claim 1 wherein the concentration of said phosphate is from about 0.005 to about 0.05 percent by weight of the mixture.

References Cited

UNITED STATES PATENTS

| | | | |
|---|---|---|---|
| 3,166,472 | 1/1965 | Menn et al. | 167—53 |
| 2,956,073 | 10/1960 | Whetstone et al. | 260—461 |

OTHER REFERENCES

Chem. Abst., 49, 986(d), 1955.

ALBERT T. MEYERS, *Primary Examiner.*

JULIAN S. LEVITT, N. G. MANN, S. FRIEDMAN, *Assistant Examiners.*